US010388325B1

(12) United States Patent
Badash et al.

(10) Patent No.: US 10,388,325 B1
(45) Date of Patent: Aug. 20, 2019

(54) NON-DISRUPTIVE NUI COMMAND

(71) Applicant: MICROSOFT TECHNOLOGY LICENSING, LLC, Redmond, WA (US)

(72) Inventors: Eyal Badash, Tel-Aviv (IL); Adi L. Miller, Ramat Hasharon (IL); Haim Somech, Ramat Gan (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/941,256

(22) Filed: Mar. 30, 2018

(51) Int. Cl.
*H04N 5/93* (2006.01)
*G11B 27/031* (2006.01)
*G11B 27/34* (2006.01)
*H04N 9/802* (2006.01)
*G10L 15/22* (2006.01)

(52) U.S. Cl.
CPC ............ *G11B 27/031* (2013.01); *G10L 15/22* (2013.01); *G11B 27/34* (2013.01); *H04N 9/802* (2013.01); *G10L 2015/223* (2013.01)

(58) Field of Classification Search
CPC ........ G06F 3/048; G06F 3/01; G06F 3/04883; G06F 8/38; Y10S 707/99953; G11B 27/31; G11B 27/34; H04N 9/802; G10L 15/22; G10L 2015/223
USPC ........ 386/278, 290, 281, 296, 326, 341, 262
See application file for complete search history.

(56) References Cited

U.S. PATENT DOCUMENTS

| | | | |
|---|---|---|---|
| 2007/0226254 A1* | 9/2007 | Moraveji | G06F 17/24 |
| 2012/0226981 A1* | 9/2012 | Clavin | G06F 3/005 715/719 |

\* cited by examiner

*Primary Examiner* — Robert Chevalier
(74) *Attorney, Agent, or Firm* — Shook, Hardy & Bacon, LLP (57) ABSTRACT

Aspects of the technology described herein provide a non-disruptive natural user interface (NUI). In aspects, the NUI input is captured within a media that is to be transmitted to a recipient. Including the NUI input within the transferred media would cause a disruption to the user experience when viewing or listening to the media. Aspects of the technology described herein identify and remove, or otherwise obscure, the NUI input, while maintaining the surrounding portion of media content that does not include the NUI command. Exemplary media that can be used with the technology described herein includes images, videos, and audio transmissions. A non-disruptive NUI input can be provided when recording a media for subsequent transmission or during a synchronous media communication session.

20 Claims, 10 Drawing Sheets

NON-DISRUPTIVE NUI COMMAND

BACKGROUND

A Natural User Interface (NUI) allows a user to communicate with a computer through speech, gestures, eye movement, and other means. Automatic speech recognition (ASR) allows a computing device to understand human speech. Understanding human speech enables voice-to-text transcription and voice commands, among other functions. Cameras can capture gestures, such as hand movements, and translate them to a computer command.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein provide a non-disruptive natural user interface (NUI). In aspects, the NUI input is captured within a media that is to be transmitted to a recipient. Including the NUI input within the transferred media would cause a disruption to the user experience when viewing or listening to the media. For example, including an audible command to increase the volume of a computing device within an audio communication would create a disruption to the user experience of listening to the audio communication. It is presently difficult to use NUI controls while the user providing the control input is being captured in an audio or video media.

Aspects of the technology described herein identify and remove, or otherwise obscure, the NUI input, while maintaining the surrounding portion of media content that does not include the NUI command. Exemplary media that can be used with the technology described herein includes images, videos, and audio transmissions.

A non-disruptive NUI input can be provided when recording a media for subsequent transmission or during a synchronous media communication session. For example, a non-disruptive NUI input can be provided while recording a video for upload to a social network. Similarly, a non-disruptive NUI input can be used during a live teleconference, video broadcast, video meeting, and such. When a non-disruptive NUI input is used during a synchronous media communication session, then a slight time delay may be built into the media transmission process to allow the media to be edited before communication to other devices.

BRIEF DESCRIPTION OF THE DRAWINGS

Aspects of the technology are described in detail below with reference to the attached drawing figures, wherein.

DETAILED DESCRIPTION

The subject matter of the technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein provide a non-disruptive natural user interface (NUI). In aspects, the NUI input is captured within a media that is to be transmitted to a recipient. For example, a presenter may pause during a video presentation with other participants, in order to instruct his computing device to increase the speaker volume. Including the NUI input within the transferred media would cause a disruption to the user experience when viewing or listening to the media. For example, including the audible command to increase the volume of the computing device within an audio communication would create a disruption to the user experience of listening to the audio communication. It is presently difficult to use NUI controls while the user providing the control input is being captured in an audio or video media.

Aspects of the technology described herein identify and remove, or otherwise obscure, the NUI input, while maintaining the surrounding portion of media content that does not include the NUI command. Exemplary media that can be used with the technology described herein includes images, videos, and audio transmissions. For example, an NUI input can be captured in an image, an audio command or physical gesture in a video, or audible command within an audio transmission. NUI inputs (also described as commands or controls) can include audio commands, gestures, and handwritten inputs, such as commands written on a white board or note pad.

A non-disruptive NUI input can be provided when recording a media for subsequent transmission or during a synchronous media communication session. For example, a non-disruptive NUI input can be provided while recording a video for upload to a social network. Similarly, a non-disruptive NUI input can be used during a live teleconference, video broadcast, video meeting, and such. When a non-disruptive NUI input is used during a synchronous media communication session, then a slight time delay may be built into the media transmission process to allow the media to be edited before communication to other devices.

Computing Environment

Figure 1:
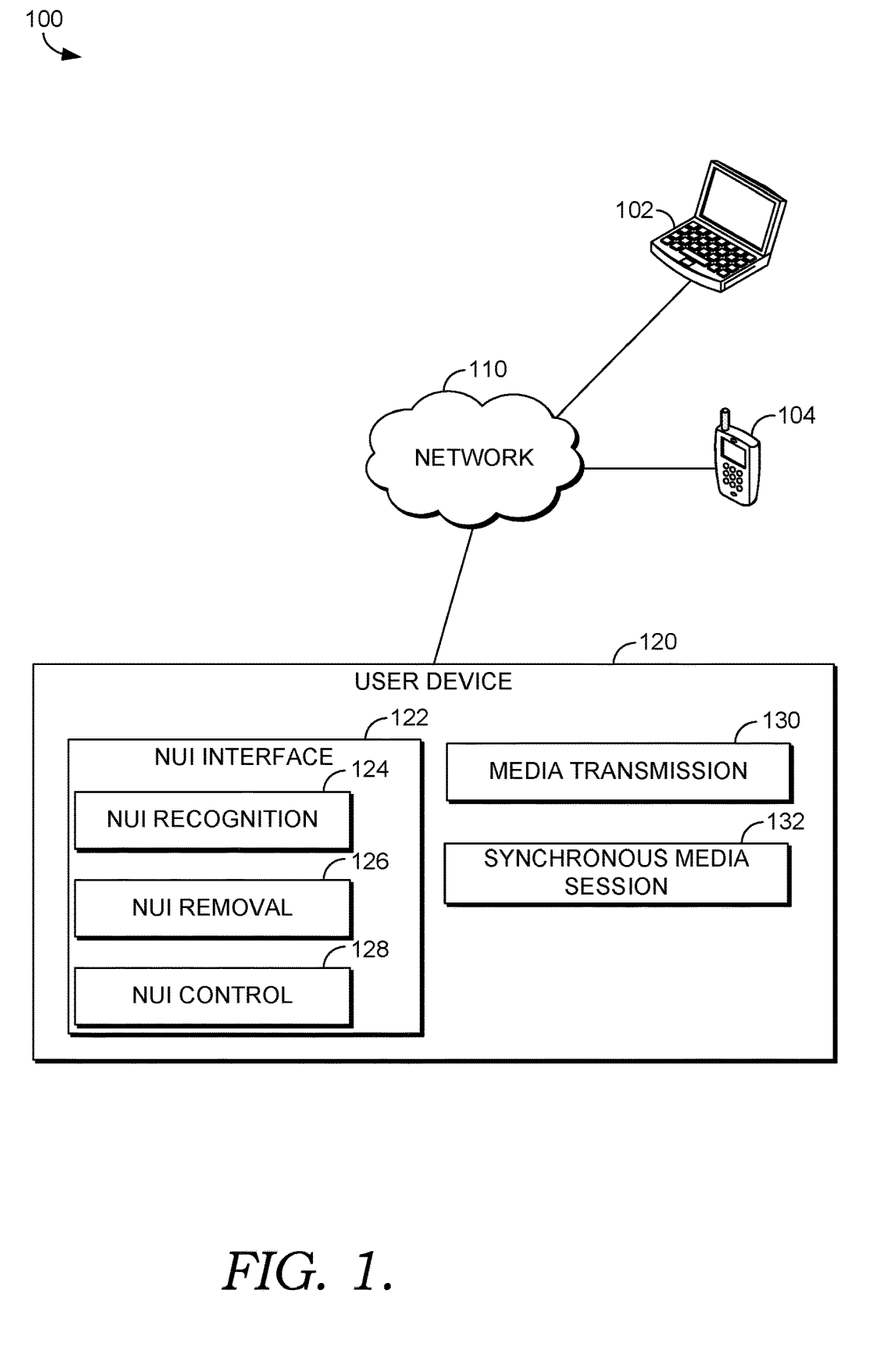
FIG. 1 is a block diagram of an exemplary computing environment suitable for using non-disruptive natural user interface (NUI) commands, in accordance with an aspect of the technology described herein.

Turning now to FIG. 1, among other components not shown, system 100 includes network 110 communicatively coupled to one or more client devices 102 and 104, and user device 120. User device 120 provides the non-disruptive NUI input and shares media with other devices, such as client devices 102 and 104. The components shown in FIG. 1 may be implemented on or using one or more computing devices, such as computing device 1000 described in connection to FIG. 10. Network 110 may include, without limitation, one or more local area networks (LANs) and/or wide area networks (WANs). Such networking environments are commonplace in offices, enterprise-wide computer networks, intranets, and the Internet. It should be understood that any number of data sources, storage components or data stores, and client devices may be employed within the system 100 within the scope of the technology described herein. Each may comprise a single device or multiple devices cooperating in a distributed environment. Additionally, other components not shown may also be included within the network environment.

Example system 100 includes client devices 102 and 104, which may comprise any type of computing device that can receive a media generated using an NUI input from user device 120. In one aspect, all devices in the system 100 can have an NUI interface. Client devices 102 and 104 may be one type of computing device described in relation to FIG. 10 herein. By way of example and not limitation, a user device may be embodied as a personal data assistant (PDA), a mobile device, smartphone, smart watch, smart glasses (or other wearable smart device), augmented reality headset, virtual reality headset, a laptop, a tablet, remote control, entertainment system, vehicle computer system, embedded system controller, appliance, home computer system, security system, consumer electronic device, or other similar electronics device.

In one embodiment, the client device is capable of receiving media data, such as audio and image information, generated during a synchronous communication session by the user device 120. The client devices may also provide content during a communication session. For example, the client device may have a microphone or line-in for receiving audio information, a camera for receiving video or image information, or a communication component (e.g., Wi-Fi functionality) for receiving such information from another source, such as the Internet.

User device 120 comprises an NUI interface 122, NUI recognition component 124, an NUI removal component 126, an NUI control component 128, a media transmission component 130, and a synchronous media session component 132. The user device 120 is able to generate media and be controlled, at least in part, by NUI commands. The user device 120 allows NUI controls to be used without including the NUI control input within media transmitted to another computing device. User device 120 and its components 122, 124, 126, 128, 130, and 132 may be embodied as a set of compiled computer instructions or functions, program modules, computer software services, or an arrangement of processes carried out on one or more computer systems, such as computing device 1000, described in connection to FIG. 10, for example.

The user device's 120 components, functions performed by these components, or services carried out by these components may be implemented at appropriate abstraction layer(s) such as the operating system layer, application layer, hardware layer, etc., of the computing system(s). Alternatively, or in addition, the functionality of these components, and/or the embodiments of technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The NUI interface 122 extracts a control input from an NUI command and communicates it to the application to control the user device, application, communication session, or some other computer function according to the command. The NUI interface also removes the NUI command from the media before communicating the media to a receiving computing device.

The NUI recognition component 124 identifies NUI commands within the media to be communicated to a recipient computing device. As mentioned, the NUI command and media content are captured through the same sensors. For example, a gesture could be made while a video is captured, an audio command given during a phone call, or text written within an image. The method used to identify the NUI command can differ depending on the media and the NUI command.

Figure 2:
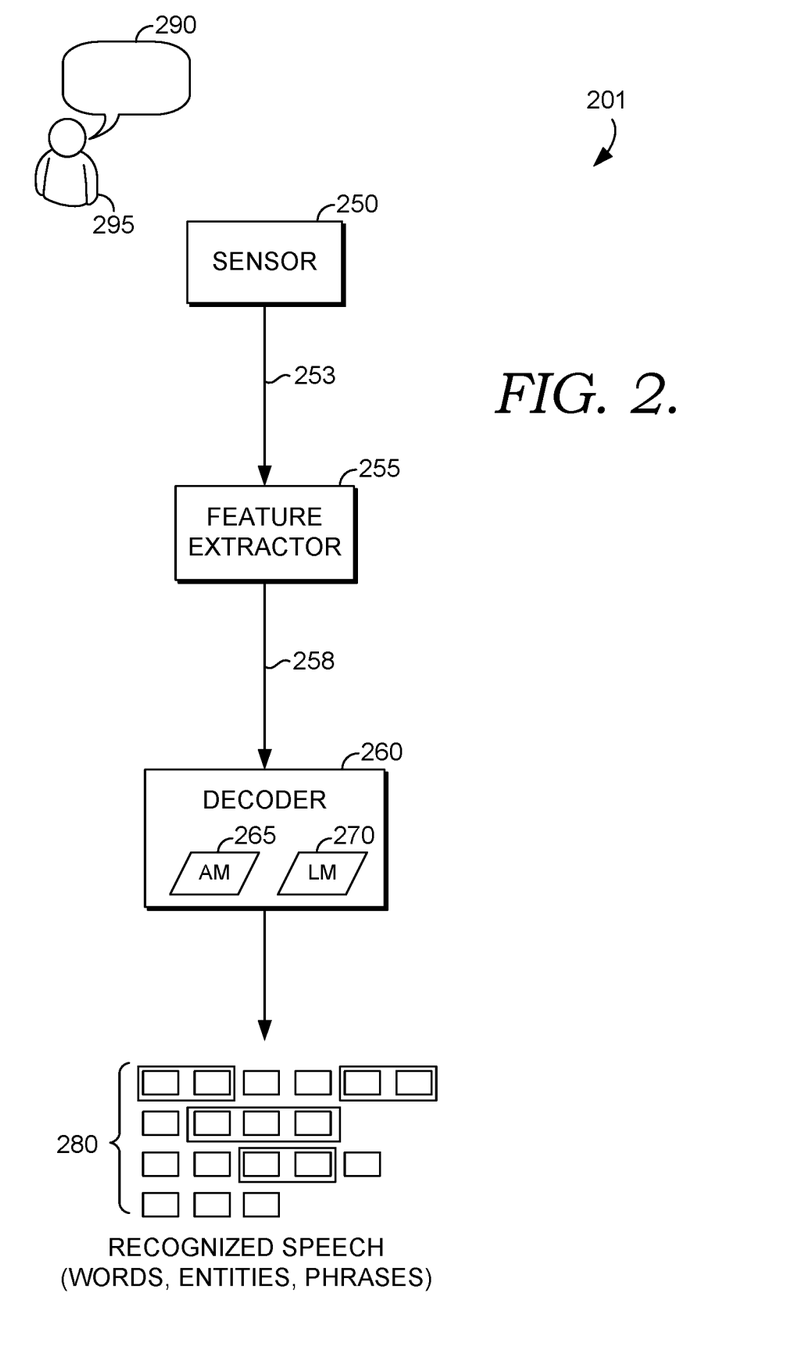
FIG. 2 is a diagram depicting an automatic speech recognition system that can be used to process a speech-based NUI command, in accordance with an aspect of the technology described herein.

Audio analysis, such as described in FIG. 2, can be used to recognize voice commands within an audio stream. The audio stream can be captured by a microphone on the user device 120. The audio stream can be part of a video or standalone audio. Either way the audio captured by a microphone can be continuously monitored for a voice command, which is one example of an NUI input.

Image analysis can be used to detect a physical gesture made by a person. The gesture can be a single pose of the user's hand or body or a series of positions. In one aspect, a depth camera is used to capture a 3D image of the user. Each pose or series of poses can be mapped to a control input used to control the user device, communication session, or similar.

Whether audible or visual, the NUI command can comprise one or more attention prompts, a control description, and a control manipulation. The attention prompt can delineate the NUI command from the other media content. In some instances, the NUI command comprises a start command followed by a control description, a control manipulation, and a stop command. The start command and stop command are both examples of attention prompts. The start command and the stop command can be used in conjunction with an audio NUI command or a visible gesture. Audio commands can be used during video or audio only media sessions. When a start and stop command are used, the NUI command can run from the instant before the start command is spoken to a moment after the stop command is spoken.

In one audio example, the start command comprises the name of a personal assistant application running on the user device. For example, "Cortana" or "Cortana please." Similarly, the stop command could be "Thanks Cortana" or similar. The stop command can also be a duration of silence after receiving the control input or a word or phrase not recognizable as part of the audio control interface. An audible prompt can be used during a video or audio communication session, such as a conference call. A full NUI command could be, "Cortana, volume up 10 percent. Thanks Cortana." In this example, the volume is the control description and the control manipulation is "up 10%." In combination, this NUI command can be processed to turn the active volume control on the user device 120 up 10%. "Thanks Cortana" is the stop command.

In one example, the attention prompt is a gesture picked up by a camera. For example, holding five fingers out palm first in front of the camera or a slow wave from left to right may be used as attention prompts. A thumbs up gesture could be the control description and the control manipulation if the gesture is mapped to turning the volume up 10% (or some other amount). Gestures may have a combined control description and control manipulation. However, it is possible to separate them. For example, in a conference room with multiple users, a first gesture (e.g., palm down) could be a control description for a floor control. Pointing to a different user could be the control manipulation and give the pointed-to user the floor (e.g., control of a presentation device in a conference room).

In another example, the attention prompt is a written word or phrase within an image. For example, the phrase "Cortana" within an image captured by a camera may be an attention prompt. A written attention prompt could be used in a situation where a person takes a picture of a white board, a notebook, or some other written product. A circle or other boundary around the NUI command could delineate the NUI input from the surrounding content.

An attention prompt is not used in all embodiments. In some aspects, an audible command can be recognized without an attention prompt. Similarly, an attention gesture is not required. A standalone gesture can be recognized and acted upon. Finally, a written word or phrase can be processed as a non-disruptive NUI without inclusion of an attention prompt. For example, writing email Bob Smith next to circled content can be a complete NUI command that does not use an attention prompt.

Once identified, the NUI can be sent to both the NUI removal component 126 and the NUI control component 128. These two components can work simultaneously. In one aspect, communication of the video is delayed briefly to allow the NUI recognition component 124 to identify the NUI input and the NUI removal component 126 to remove the NUI input from the media. The delay could be 20 ms, 40 ms, 80 ms, or some other delay depending on the hardware and software capabilities of the user device 120. In one aspect, the delay is calculated based on an analysis of the time taken to identify a gesture.

The NUI removal component 126 removes, obscures, or deemphasizes the NUI input within the media. Initially, the bounds of the NUI command are identified. Identifying the bounds of NUI command differs depending on the media and the nature of the NUI command. As previously described, a voice command can have a starting point and an ending point. An audio command can be removed by deleting the portion of audio between the starting and ending points inclusive of the starting command and ending command, if present. If the audio command is given during a video, the video frames can be unaltered.

On the other hand, a gesture can be removed or obscured by altering the video frames without altering the audio content. In one aspect, the first video frame comprising a gesture is deleted along with all subsequent frames until the gesture concludes. These deleted frames can be replaced with the last frame prior to the first deleted video frame. The recipient of the video may perceive the video freezing briefly. Alternatively, it may be possible to zoom into a portion of the video that does not include the gesture. Cropping is an alternative to zooming that allows the portion of video that does not include the gesture to be shown.

Figure 4:
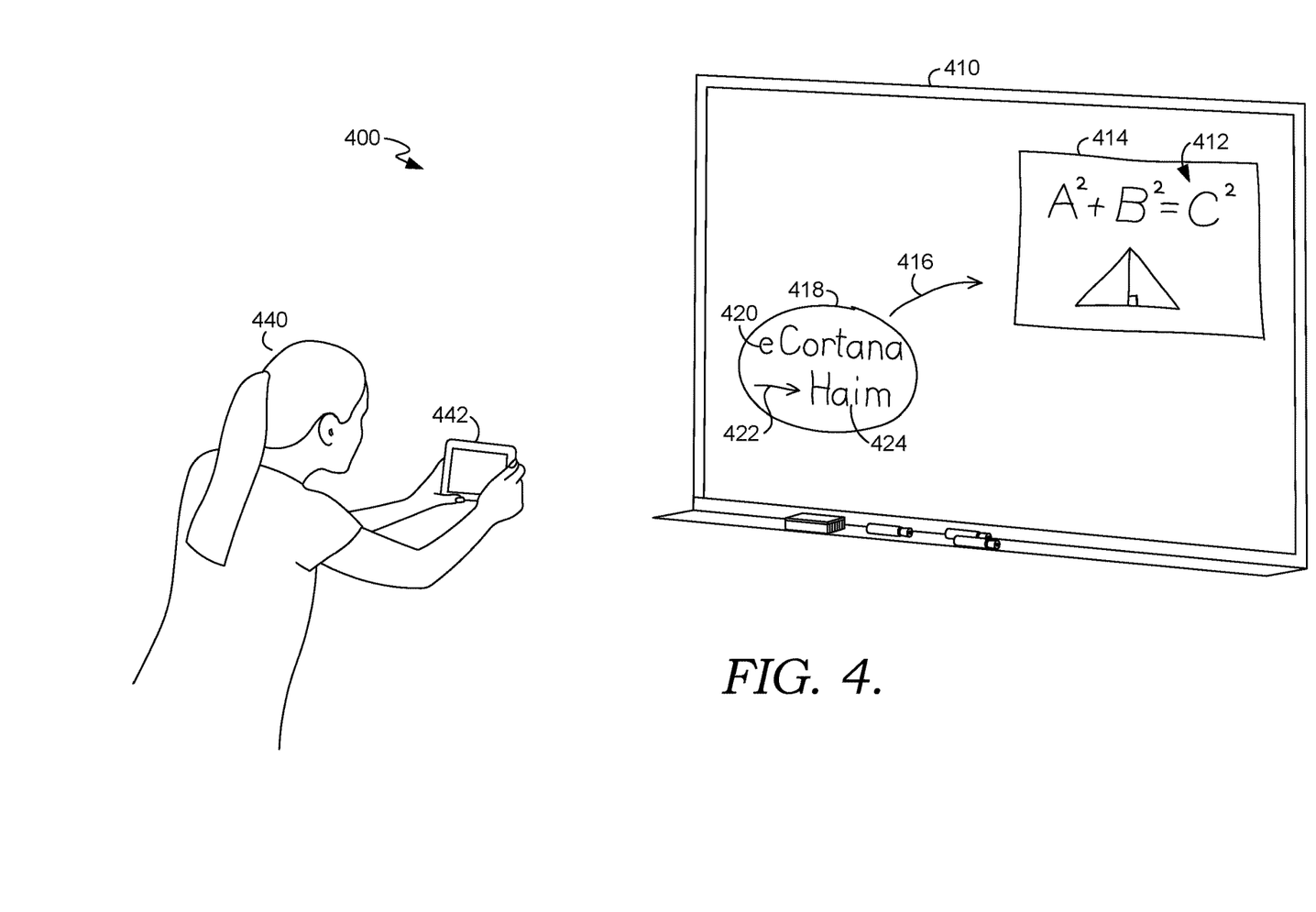
FIG. 4 is a diagram depicting a non-disruptive NUI scenario using image as input, in accordance with an aspect of the technology described herein.
Figure 5:
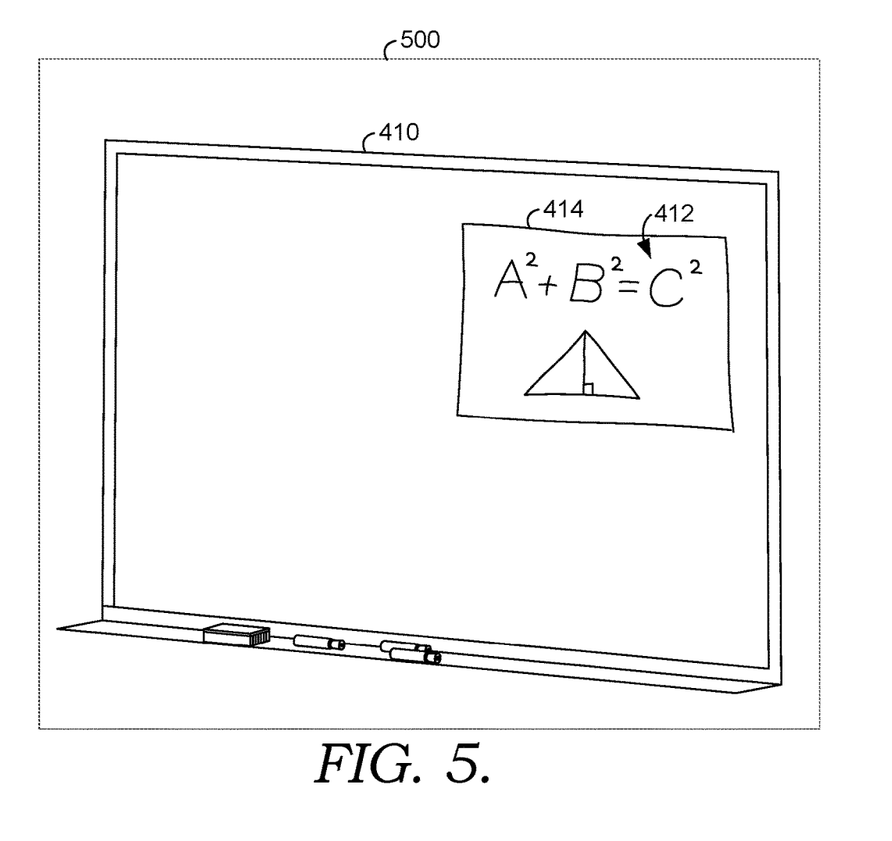
FIG. 5 is a diagram depicting an output generated from a non-disruptive NUI scenario using an image as input, in accordance with an aspect of the technology described herein.
Figure 6:
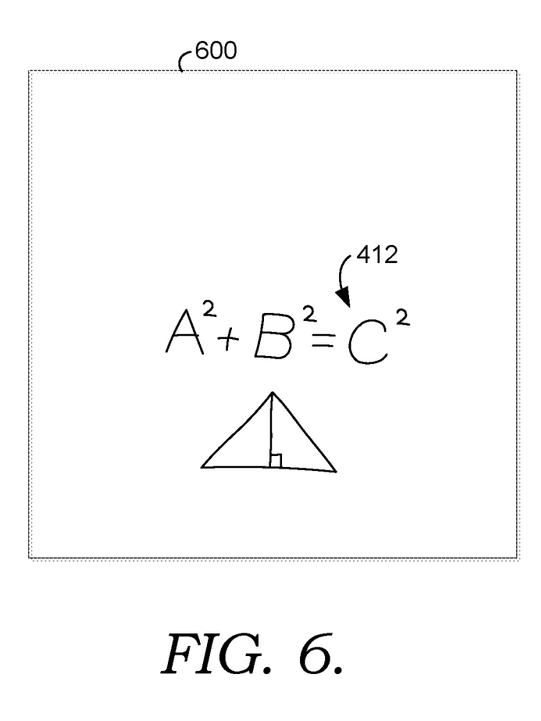
FIG. 6 is a diagram depicting an alternative output generated from a non-disruptive NUI scenario using an image as input, in accordance with an aspect of the technology described herein.

Removal of an NUI command from an image is described with references to FIGS. 4, 5, and 6.

The NUI control component 128 changes a state of the user device 120 in response to the NUI input. Initially, the NUI control component 128 maps the input to a control output. For example, the NUI control component 128 may have a group of voice commands that map to a plurality of controls on the user device 120. After identifying the voice command, the input is provided to the control, in the same way an input could be provided through a mouse, touchscreen, keyboard, or other input device. Gestures work in a similar fashion, the gesture is identified image analysis and mapped to a known control. The control input is then provided to the appropriate control.

The media transmission component 130 communicates the altered media to one or more recipient devices.

The synchronous media session component 132 can establish and manage a synchronous media session, such as a video conference, teleconference, live video stream, or other similar communication session.

Automatic Speech Recognition System

Turning now to FIG. 2, an example of an automatic speech recognition (ASR) system is shown according to an embodiment of the technology described herein. The ASR system 201 shown in FIG. 2 is just one example of an ASR system that is suitable for use for identifying a speaker-specific speech signal that can ultimately be used to understand the speaker's speech, including identifying an audible NUI command. It is contemplated that other variations of ASR systems may be used including ASR systems that include fewer components than the example ASR system shown here, or additional components not shown in FIG. 2. The ASR system can be implemented on a computing device having a processor and a memory, such as computing device 1000 described subsequently. The memory can comprise computer executable code that configures the computing device to perform the ASR functions described herein once executed.

The ASR system 201 shows a sensor 250 that senses acoustic information (audibly spoken words or speech 290) provided by user-speaker 295 as well as background noise. The background noise can include music, crowd noise, etc. Sensor 250 may comprise one or more microphones or acoustic sensors, which may be embodied on a user device (such as client devices 102 or 104, described in FIG. 1). Sensor 250 converts the speech 290 into acoustic signal information 253 that may be provided to a feature extractor 255 (or may be provided directly to decoder 260, in some embodiments). In some embodiments, the acoustic signal may undergo preprocessing (not shown) before feature extractor 255. Feature extractor 255 generally performs feature analysis to determine the parameterized useful features of the speech signal while reducing noise corruption or otherwise discarding redundant or unwanted information. Feature extractor 255 transforms the acoustic signal into features 258 (which may comprise a speech corpus) appropriate for the models used by decoder 260. The features 258 can include features that correspond to the speech 290.

Decoder 260 comprises an acoustic model (AM) 265 and a language model (LM) 270. The AM 265 can use neural network model or other method to extract features from the features 258 provided. Once a feature set is generated for the speaker, the AM 265 can process the specific features to identify words and sounds, such as a voice token corresponding to an NUI start command or stop command.

AM 265 comprises statistical representations of distinct sounds that make up a word, which may be assigned a label called a "phenome." The AM 265 can assign the labels to sounds. AM 265 can model the phenomes based on the speech features and provides to LM 270 a corpus comprising a sequence of words corresponding to the speech corpus. As an alternative, the AM 265 can provide a string of phenomes to the LM 270. LM 270 receives the corpus of words or phenomes and determines a recognized speech 280, which may comprise words, entities (classes), or phrases, including NUI commands.

In some embodiments, the LM 270 may reflect specific subdomains or certain types of corpora, such as certain classes (e.g., personal names, locations, dates/times, movies, games), words or dictionaries, NUI commands, phrases, or combinations of these.

Figure 3:
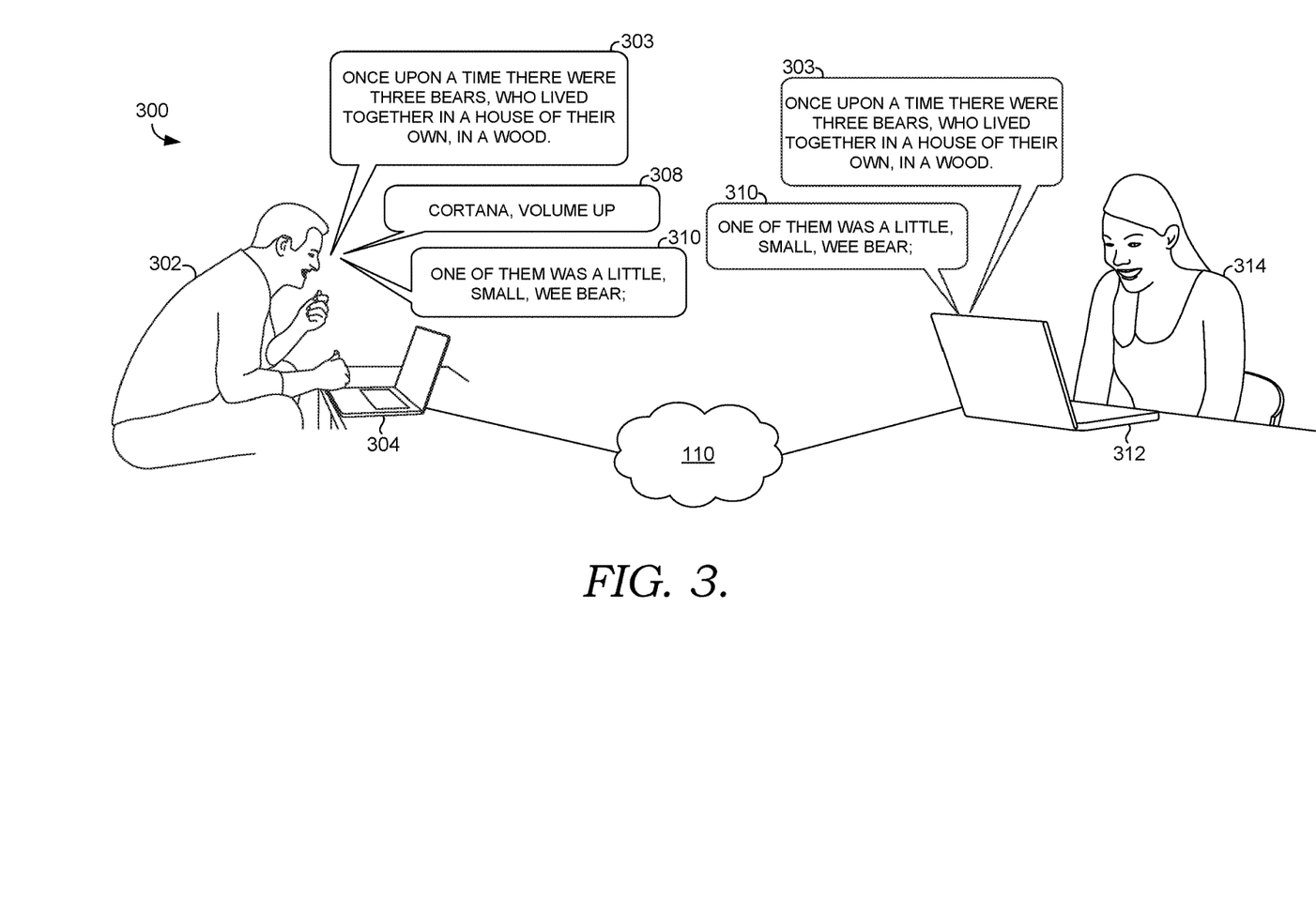
FIG. 3 is a diagram depicting a non-disruptive NUI scenario using speech commands, in accordance with an aspect of the technology described herein.

Turning now to FIG. 3, user environment 300 illustrates a non-disruptive NUI command, according to an aspect of the technology described herein. The user environment 300 illustrates a communication session between a speaker 302 and a recipient 314. The speaker 302 communicates with the recipient 314 through the sending laptop 304. The recipient 314 receives communications through the receiving laptop 312. The two laptops are connected over network 110. The communication session can be bidirectional allowing the recipient 314 to speak with the speaker 302. However, for the sake of simplicity only the speaker 302 is speaking in this example.

The active communication session can include audio and video content. The audio and video content can be captured by cameras and microphones on the two laptop devices. Alternatively, a peripheral device (not shown), such as a web cam could be used. Only the audio communications are depicted in FIG. 3, but the audio processing of an audible NUI command can work the same way for either an audio only session or an audio and video communication session.

As part of the communication session, the speaker 302 makes statement 303, which is output through a speaker in the receiving laptop 312. Next the speaker 302 speaks the NUI command 308, "Cortana, volume up." The NUI command 308 is not communicated to the recipient 314 through the receiving laptop 312. The speaker 302 then makes a second statement 310 which is also output through the receiving laptop 312.

The NUI command 308 includes the attention prompt "Cortana" followed by a control description and a control manipulation. In this example, the volume is the control description and the control manipulation is "up." In an aspect, an automatic speech recognition system is continually monitoring the audio signal within the communication session for an attention prompt.

Once the NUI command is detected within the audio signal, two processes are initiated. The two processes may run, more or less, in parallel. First, an audio editing function is initiated to remove the NUI command from the audible signal. Second, the NUI command is processed. For NUI processing, the text "volume up" can be used to call a volume control function within the laptop 304 and increment the volume up a designated portion, such as 10%, 20%, 30%, or such.

The audio editing function determines a starting point within the audio signal where the NUI command was initiated. The audio editing function also determines an endpoint. The portion of the audio signal between the starting point and the ending point is then deleted from the audio signal output through the laptop 312. As can be seen, the laptop 312 outputs the first statement 303 and the second statement 310, but does not output the NUI command 308. In order to allow for deletion of the audio signal, a delay may be built into the communication session. In one aspect, a buffer is used to hold the audio and video signal for a period slightly longer than it takes an automatic speech recognition system to process an audio signal and recognize an NUI command. It should be noted that the video signal does not need to be interrupted or edited in this example. Accordingly, the recipient 314 will continue to see a video of the speaker 302, but will not hear the audio associated with the NUI command 308.

Aspects of the technology are not limited to a command that controls the sending laptop 304. NUI commands that control the communication session can also be processed in the same way. As used herein, commands that change the communication session change the state of the sending laptop 304 because the speaker's 302 user interface may change as a result. Exemplary NUI commands that may be suitable for controlling the communication session include instructions to mute one or more users, to grant one or more users access to shared content, to grant one or more users access to the communication session, to give one or more users control of the sending laptop 304, to change the content or screen shown within the communication session, and such.

Turning now to FIG. 4, a user environment 400 in which a non-disruptive NUI captured by a single image is illustrated, according to an aspect of the technology described herein. The user environment 400 includes a user 440 taking a picture with her smart phone 442 of a whiteboard 410. The whiteboard includes primary content 412 enclosed in a hand-drawn box 414. A hand-drawn NUI command 418 delineated by a circle is also drawn on the whiteboard 410. The circle can help delineate the NUI command 418 from content.

The NUI command 418 includes an attention prompt 420 "@Cortana." In this example, the NUI command 418 comprises the volume as the control description of the arrow 422 and the control manipulation is "Haim" 424 in conjunction with the content identification arrow 416. In this example, the arrow 422 control description is interpreted as a command to communicate designated content to a recipient. In this example, "Haim" 424 is the recipient.

In an aspect, "Haim" can be mapped to an email address, phone number, social media account, or other destination to which content can be sent. In one aspect, Haim can be matched to a name in the contacts of the user 440. If multiple people named Haim are found, a disambiguation process can be used. For example, a Haim that is known to be participating in a meeting during which an image of the whiteboard 410 was taken could be selected as the presumptive recipient. Similarly, the preferred method of communication could be based on an analysis of previous communications between the user 440 and Haim. In one aspect, a draft communication address to Haim is prepared for approval by the user 440 prior to communicating the content.

Aspects of the technology may remove the NUI command 418 from the image captured by the smartphone 442 prior to communicating the image to a second device. In one aspect, the portion of an image comprising the NUI command 218 is edited to match the background surrounding the portion. If this message is used, a recipient, in this case Haim, will receive an image similar to image 500 shown in FIG. 5. As can be seen in FIG. 5, the NUI command 218 has been removed, leaving the content 412 and the box 414 in the image 500 transferred to a second device. Deleting an NUI command from an image while leaving the rest of the image unedited is one method of implementing a non-disruptive NUI input.

In another aspect, the content 412 is isolated from the rest of the image and only the designated content 412 is shared. Focusing on the content to be shared to the exclusion of the NUI control is one method of providing a non-disruptive NUI control. If only the content is shared, then the NUI control is not visible. FIG. 6 shows an image 600 of what an image of the whiteboard 410 could be transformed into in response to the NUI command 418.

Figure 7:
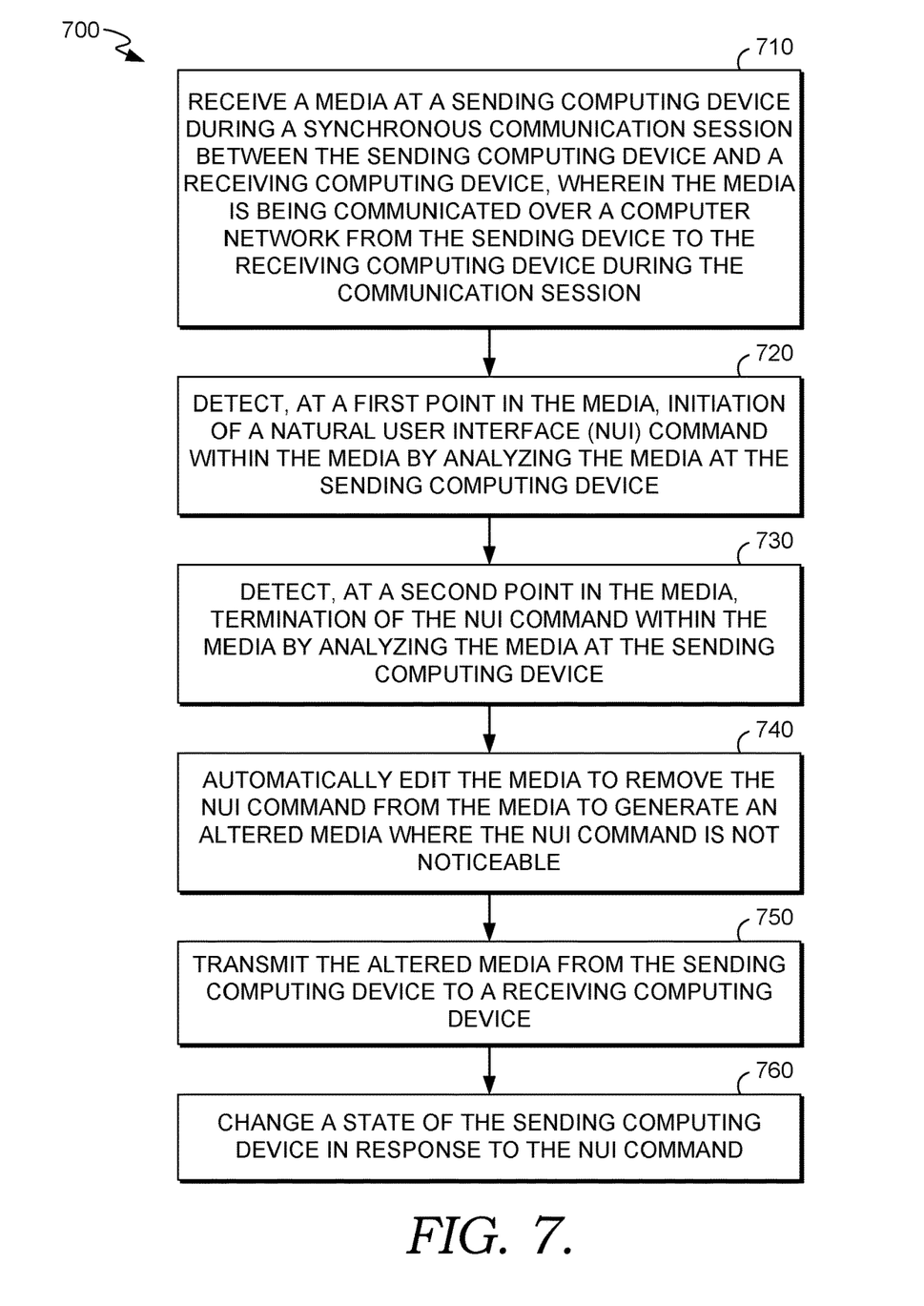
FIG. 7 is a flow chart depicting a method of responding to a natural user interface control, in accordance with an aspect of the technology described herein.

Turning now to FIG. 7, a flow chart showing method 700 of responding to a natural user interface control is provided. Method 700 may be used during a video conference, online phone call, online presentation, or other communication session where media content is shared with one or more remote users in near real time. Communication sessions where users are able to share content in near real time may be described as a synchronous communication session. As used herein, near real time means with a delay of less than five seconds between generating the content (e.g., capturing a video or audio input) and sharing the content.

At step 710, a media is received at a sending computing device during a synchronous communication session between the sending computing device and a receiving computing device. The media is being communicated over a computer network from the sending computing device to the receiving computing device during the synchronous communication session. Examples of a synchronous media session could include a video conference, teleconference, live video stream, or similar.

At step 720, initiation of an NUI command is detected at a first point within the media by analyzing the media at the sending computing device. At step 730, termination of the NUI command is detected at a second point within the media by analyzing the media at the sending computing device.

As mentioned, the NUI command and media content are captured through the same sensors. For example, a gesture could be made while a video is captured, an audio command given during a phone call, or text written within an image. The method used to identify the NUI command can differ depending on the media and the NUI command.

Audio analysis, such as described in FIG. 2, can be used to recognize voice commands within an audio stream. The audio stream can be captured by a microphone on the user device 120. The audio stream can be part of a video or standalone audio. Either way the audio captured by a microphone can be continuously monitored for a voice command, which is one example of an NUI input.

Image analysis can be used to detect a physical gesture made by a person. The gesture can be a single pose of the user's hand or body or a series of positions. In one aspect, a depth camera is used to capture a 3D image of the user. Each pose or series of poses can be mapped to a control input used to control the user device, communication session, or similar.

Whether audible or visual, the NUI command can comprise one or more attention prompts, a control description, and a control manipulation. The attention prompt can delineate the NUI command from the other media content. In some instances, the NUI command comprises a start command followed by a control description, a control manipulation, and a stop command. The start command and stop command are both examples of attention prompts. The start command and the stop command can be used in conjunction with an audio NUI command or a visible gesture. Audio commands can be used during video or audio only media sessions. When a start and stop command are used, the NUI command can run from the instant before the start command is spoken to a moment after the stop command is spoken.

In one audio example, the start command comprises the name of a personal assistant application running on the user device. For example, "Cortana" or "Cortana please." Similarly, the stop command could be "Thanks Cortana" or similar. The stop command can also be a duration of silence after receiving the control input or a word or phrase not recognizable as part of the audio control interface. An audible prompt can be used during a video or audio communication session, such as a conference call. A full NUI command could be, "Cortana, volume up 10 percent. Thanks Cortana." In this example, the volume is the control description and the control manipulation is "up 10%." In combination, this NUI command can be processed to turn the active volume control on the user device 120 up 10%. "Thanks Cortana" is the stop command.

In one example, the attention prompt is a gesture picked up by a camera. For example, holding five fingers out palm first in front of the camera or a slow wave from left to right are possible attention prompts. A thumbs up gesture could be the control description and the control manipulation if the gesture is mapped to turning the volume up 10% (or some other amount). Gestures may have a combined control description and control manipulation. However, it is possible to separate them. For example, in a conference room with multiple users, a first gesture (e.g., palm down) could be a control description for a floor control. Pointing to a different user could be the control manipulation and give the pointed-to user the floor (e.g., control of a presentation device in a conference room).

At step 740, the media is automatically edited to remove the NUI command from the media to generate an altered media where the NUI command is not noticeable. An audio command can be removed by deleting the portion of audio between the starting and ending points inclusive of the starting command and ending command, if present. If the audio command is given during a video, the video frames can be unaltered.

On the other hand, a gesture can be removed or obscured by altering the video frames without altering the audio content. In one aspect, the first video frame comprising a gesture is deleted along with all subsequent frames until the gesture concludes. These deleted frames can be replaced with the last frame prior to the first deleted video frame. The recipient of the video may perceive the video freezing briefly. Alternatively, it may be possible to zoom into a portion of the video that does not include the gesture. Cropping is an alternative to zooming that allows the portion of video that does not include the gesture to be shown.

At step 750, the altered media is transmitted from the sending computing device to a receiving computing device.

At step 760, a state of the sending computing device is changed in response to the NUI command Initially, the NUI control component 128 maps the input to a control output. For example, the NUI control component 128 may have a group of voice commands that map to a plurality of controls on the user device 120. After identifying the voice command, the input is provided to the control, in the same way an input could be provided through a mouse, touchscreen, keyboard, or other input device. Gestures work in a similar fashion, the gesture is identified image analysis and mapped to a known control. The control input is then provided to the appropriate control. Changing the state of the computing device can include changing an aspect of the synchronous communication session.

In one aspect, the recipient of the altered media is designated in the NUI command. For example, an audible command to "add Jen to the video conference" could designated Jen as a recipient of the media.

Figure 8:
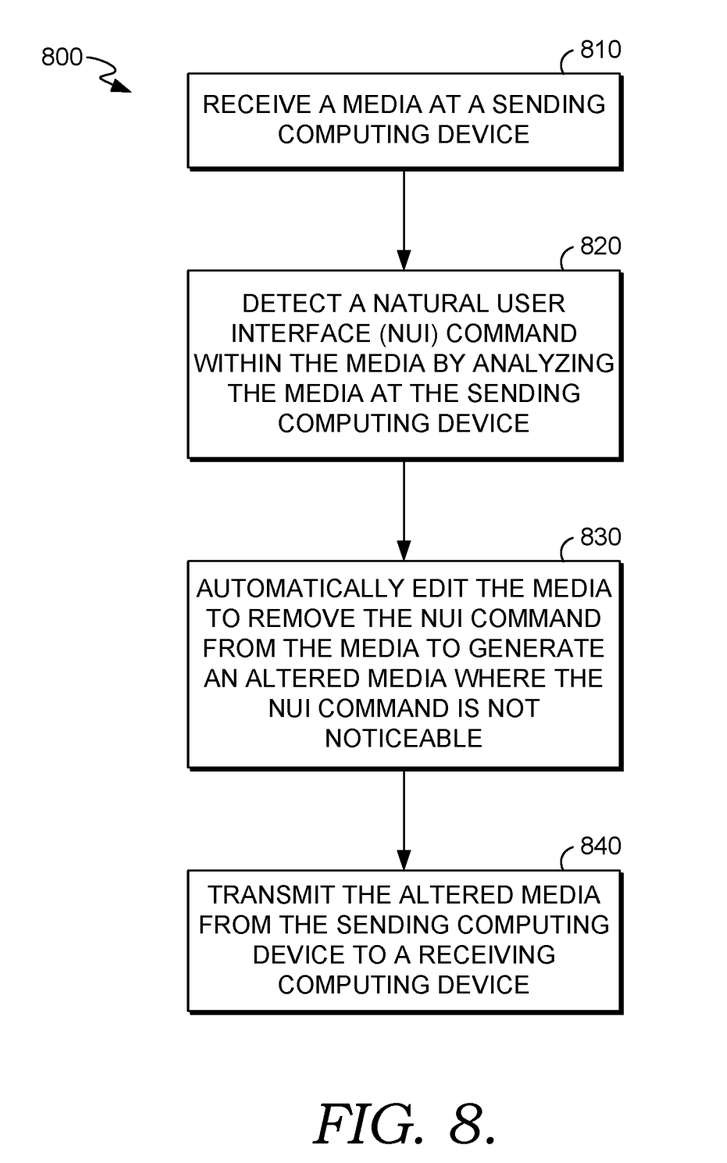
FIG. 8 is a flow chart depicting a method of responding to a natural user interface control, in accordance with an aspect of the technology described herein.

Turning now to FIG. 8, a flow chart showing method 800 of responding to a natural user interface control is provided. Method 800 may be used to respond to an NUI command within an image or other visible media. For example, method 800 could be used to act on a NUI command written on a white board that is depicted in a photograph of the white board. At step 810, a media is received at a sending computing device. The media could be a picture of a writing surface, such as a white board or notepad, taken by a smartphone or other camera.

At step 820, an NUI command is detected within the media by analyzing the media at the sending computing device. As mentioned, the NUI command and media content are captured through the same sensors. For example, a gesture could be made while a video is captured, an audio command given during a phone call, or text written within an image. The method used to identify the NUI command can differ depending on the media and the NUI command.

Audio analysis, such as described in FIG. 2, can be used to recognize voice commands within an audio stream. The audio stream can be captured by a microphone on the user device 120. The audio stream can be part of a video or standalone audio. Either way the audio captured by a microphone can be continuously monitored for a voice command, which is one example of an NUI input.

Image analysis can be used to detect a physical gesture made by a person. The gesture can be a single pose of the user's hand or body or a series of positions. In one aspect, a depth camera is used to capture a 3D image of the user. Each pose or series of poses can be mapped to a control input used to control the user device, communication session, or similar.

Whether audible or visual, the NUI command can comprise one or more attention prompts, a control description, and a control manipulation. The attention prompt can delineate the NUI command from the other media content. In some instances, the NUI command comprises a start command followed by a control description, a control manipulation, and a stop command. The start command and stop command are both examples of attention prompts. The start command and the stop command can be used in conjunction with an audio NUI command or a visible gesture. Audio commands can be used during video or audio only media sessions. When a start and stop command are used, the NUI command can run from the instant before the start command is spoken to a moment after the stop command is spoken.

In one audio example, the start command comprises the name of a personal assistant application running on the user device. For example, "Cortana" or "Cortana please." Similarly, the stop command could be "Thanks Cortana" or similar. The stop command can also be a duration of silence after receiving the control input or a word or phrase not recognizable as part of the audio control interface. An audible prompt can be used during a video or audio communication session, such as a conference call. A full NUI command could be, "Cortana, volume up 10 percent. Thanks Cortana." In this example, the volume is the control description and the control manipulation is "up 10%." In combination, this NUI command can be processed to turn the active volume control on the user device 120 up 10%. "Thanks Cortana" is the stop command.

In one example, the attention prompt is a gesture picked up by a camera. For example, holding five fingers out palm first in front of the camera or a slow wave from left to right are possible attention prompts. A thumbs up gesture could be the control description and the control manipulation if the gesture is mapped to turning the volume up 10% (or some other amount). Gestures may have a combined control description and control manipulation. However, it is possible to separate them. For example, in a conference room with multiple users, a first gesture (e.g., palm down) could be a control description for a floor control. Pointing to a different user could be the control manipulation and give the pointed-to user the floor (e.g., control of a presentation device in a conference room).

In another example, the attention prompt is a written word or phrase within an image. For example, the phrase "Cortana" within an image captured by a camera may be an attention prompt. A written attention prompt could be used in a situation where a person takes a picture of a whiteboard, a notebook, or some other written product. A circle or other boundary around the NUI command could delineate the NUI input from the surrounding content. In one aspect, the NUI command identifies a recipient of the content in the image, as described with reference to FIGS. 4-6.

At step 830, the media is automatically edited to remove the NUI command from the media to generate an altered media where the NUI command is not noticeable. Initially, the bounds of the NUI command are identified. Identifying the bounds of the NUI command differs depending on the media and the nature of the NUI command. As previously described, a voice command can have a starting point and an ending point. An audio command can be removed by deleting the portion of audio between the starting and ending points inclusive of the starting command and ending command, if present. If the audio command is given during a video, the video frames can be unaltered.

On the other hand, a gesture can be removed or obscured by altering the video frames without altering the audio content. In one aspect, the first video frame comprising a gesture is deleted along with all subsequent frames until the gesture concludes. These deleted frames can be replaced with the last frame prior to the first deleted video frame. The recipient of the video may perceive the video freezing briefly. Alternatively, it may be possible to zoom into a portion of the video that does not include the gesture. Cropping is an alternative to zooming that allows the portion of video that does not include the gesture to be shown.

Editing an image is illustrated with reference to FIGS. 4-6. In one example, the portion of the image associated with the NUI command is deleted and replaced with fill that matches an adjacent background color of an image. In another example, only a portion of content from the image is shared by cropping all but the shared content.

At step 840, the altered media is transmitted from the sending computing device to a receiving computing device.

Figure 9:
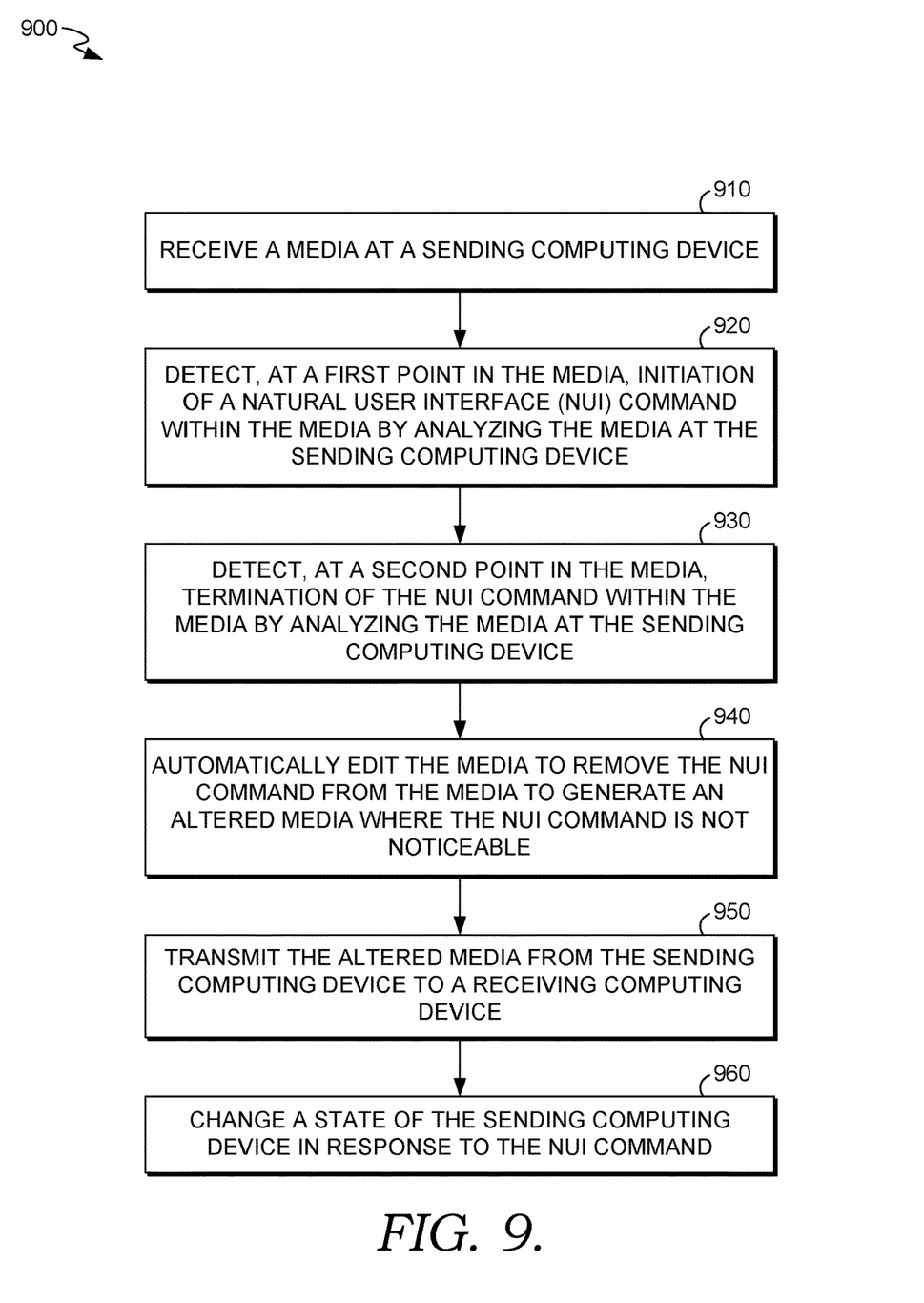
FIG. 9 is a flow chart depicting a method of responding to a natural user interface control, in accordance with an aspect of the technology described herein.

Turning now to FIG. 9, a flow chart showing method 900 of responding to a natural user interface control is provided. At step 910, a media is received at a sending computing device. The media could be an audio or video media, such as a video conference. At step 920, initiation of an NUI command is detected at a first point within the media by analyzing the media at the sending computing device. This has been described previously with reference to FIGS. 2 and 7.

At step 930, termination of the NUI command is detected at a second point within the media by analyzing the media at the sending computing device. This has been described previously with reference to FIGS. 2 and 7.

At step 940, the media is automatically edited to remove the NUI command from the media to generate an altered media where the NUI command is not noticeable. This has been described previously with reference to FIGS. 2 and 7.

At step 950, the altered media is transmitted from the sending computing device to a receiving computing device.

At step 960, a state of the sending computing device is changed in response to the NUI command. This has been described previously with reference to FIGS. 2 and 7.

Exemplary Operating Environment

Figure 10:
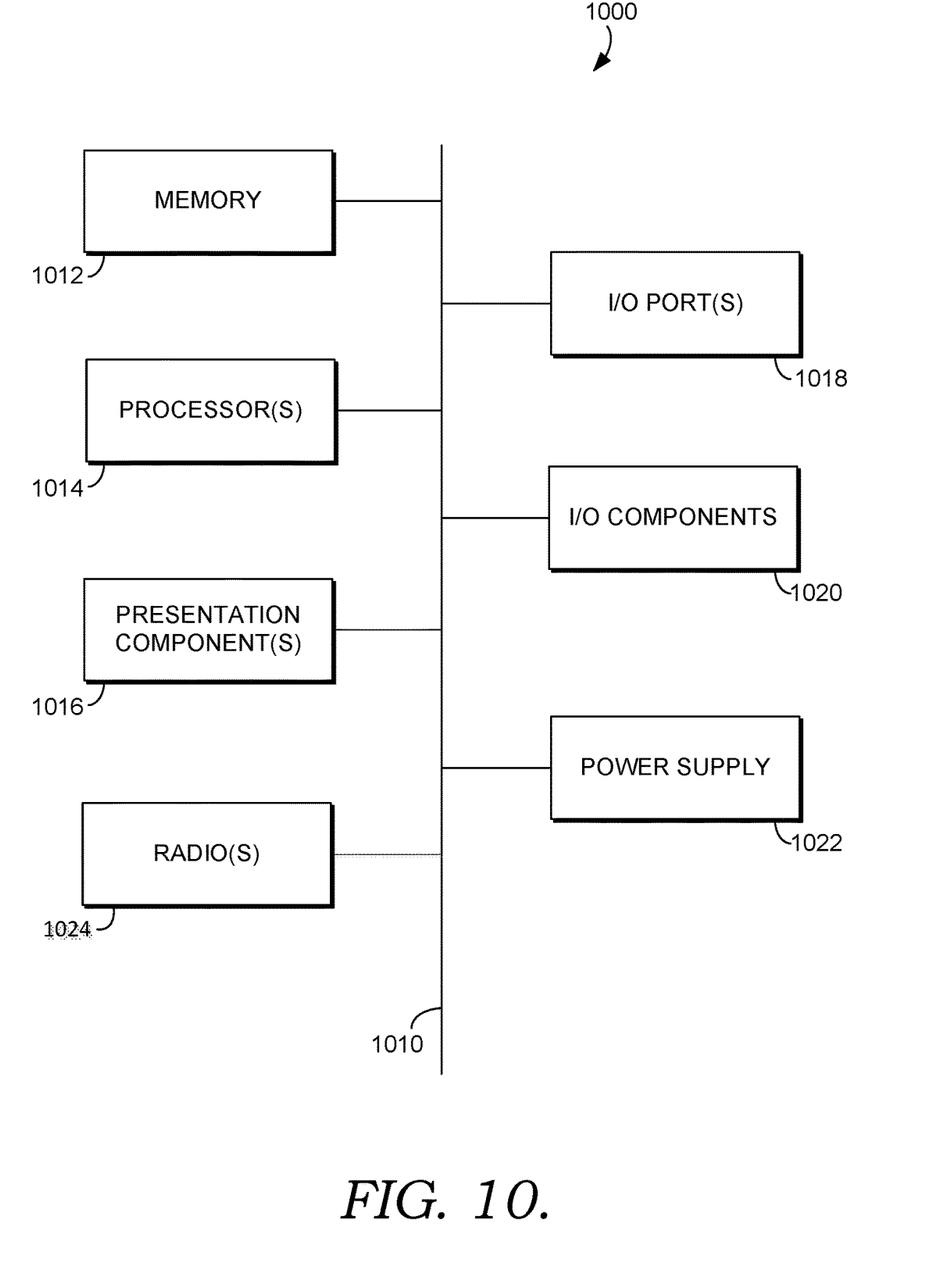
FIG. 10 is a block diagram of an exemplary computing environment suitable for implementing aspects of the technology described herein.

Referring to the drawings in general, and initially to FIG. 10 in particular, an exemplary operating environment for implementing aspects of the technology described herein is shown and designated generally as computing device 1000. Computing device 1000 is but one example of a suitable computing environment and is not intended to suggest any limitation as to the scope of use or functionality of the technology described herein. Neither should the computing device 1000 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 10, computing device 1000 includes a bus 1010 that directly or indirectly couples the following devices: memory 1012, one or more processors 1014, one or more presentation components 1016, input/output (I/O) ports 1018, I/O components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 10 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 10 and refer to "computer" or "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1012 includes computer storage media in the form of volatile and/or nonvolatile memory. The memory 1012 may be removable, non-removable, or a combination thereof. Exemplary memory includes solid-state memory, hard drives, optical-disc drives, etc. Computing device 1000 includes one or more processors 1014 that read data from various entities such as bus 1010, memory 1012, or I/O components 1020. Presentation component(s) 1016 present data indications to a user or other device. Exemplary presentation components 1016 include a display device, speaker, printing component, vibrating component, etc. I/O ports 1018 allow computing device 1000 to be logically coupled to other devices including I/O components 1020, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 1014 may be direct or via a coupling utilizing a serial port, parallel port, and/or other interface and/or system bus known in the art. Furthermore, the digitizer input component may be a component separated from an output component such as a display device, or in some embodiments, the usable input area of a digitizer may be coextensive with the display area of a display device, integrated with the display device, or may exist as a separate device overlaying or otherwise appended to a display device. Any and all such variations, and any combination thereof, are contemplated to be within the scope of embodiments of the technology described herein.

An NUI processes air gestures, voice, or other physiological inputs generated by a user. Appropriate NUI inputs may be interpreted as ink strokes for presentation in association with the computing device 1000. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

A computing device may include a radio 1024. The radio 1024 transmits and receives radio communications. The computing device may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Embodiments

Aspects of the technology described herein have been described to be illustrative rather than restrictive. It will be understood that certain features and subcombinations are of utility and may be employed without reference to other features and subcombinations. This is contemplated by and is within the scope of the claims.

The invention claimed is:

1. One or more computer hardware storage media comprising computer executable instructions that, when executed by a computing device, cause the computing device to perform a method of responding to a natural user interface control, comprising:
receiving a media at a sending computing device during a synchronous communication session between the sending computing device and a receiving computing device, wherein the media is being communicated over a computer network from the sending computing device to the receiving computing device during the synchronous communication session;
detecting, at a first point in the media, initiation of a natural user interface (NUI) command within the media by analyzing the media at the sending computing device;
detecting, at a second point in the media, termination of the NUI command within the media by analyzing the media at the sending computing device;
automatically editing the media to remove the NUI command from the media to generate an altered media where the NUI command is not noticeable;
transmitting the altered media from the sending computing device to a receiving computing device; and
changing a state of the sending computing device in response to the NUI command.

2. The media of claim 1, wherein the media is video.

3. The media of claim 2, wherein detecting the termination comprises identifying a stop gesture within the media and detecting the initiation comprises identifying a start gesture within the media.

4. The media of claim 3, wherein automatically editing comprises deleting video frames between the first point in the media and the second point in the media.

5. The media of claim 1, wherein detecting the initiation comprises identifying an audible start command within the media and detecting the termination comprises identifying an audible stop command within the media.

6. The media of claim 5, wherein the NUI command is identified by analyzing a voice token received between the audible start command and the audible stop command.

7. The media of claim 5, wherein automatically editing comprises deleting audio content between the first point in the media and the second point in the media without altering visible content during the first point in the media and the second point in the media.

8. The media of claim 1, wherein the NUI command comprises a control description and a control manipulation.

9. A method of responding to a natural user interface control, the method comprising:
receiving a media at a sending computing device;
detecting a natural user interface (NUI) command within the media by analyzing the media at the sending computing device;
automatically editing the media to remove the NUI command from the media to generate an altered media where the NUI command is not noticeable; and
transmitting the altered media from the sending computing device to a receiving computing device.

10. The method of claim 9, wherein the transmitting occurs in response to instructions in the NUI command.

11. The method of claim 9, wherein the media is an image captured by the sending computing device.

12. The method of claim 11, wherein said detecting the NUI command in the image comprises identifying a textual NUI attention word or phrase within the image using image analysis.

13. The method of claim 11, wherein automatically editing comprises deleting a portion of the image that includes the NUI command.

14. The method of claim 9, wherein automatically editing comprises deleting audio content within the media that includes the NUI command without altering visible content.

15. The method of claim 9, further comprising identifying the receiving computing device through the NUI command.

16. A method of responding to a natural user interface control comprising:
receiving a media at a sending computing device;

detecting, at a first point in the media, initiation of a natural user interface (NUI) command within the media by analyzing the media at the sending computing device;

detecting, at a second point in the media, termination of the NUI command within the media by analyzing the media at the sending computing device;

automatically editing the media to remove the NUI command from the media to generate an altered media where the NUI command is not noticeable;

transmitting the altered media from the sending computing device to a receiving computing device; and changing a state of the sending computing device in response to the NUI command.

17. The method of claim 16, wherein detecting the termination comprises identifying a stop gesture within the media and detecting the initiation comprises identifying a start gesture within the media.

18. The method of claim 16, wherein automatically editing comprises deleting video frames between the first point in the media and the second point in the media.

19. The method of claim 16, wherein detecting the initiation comprises identifying an audible start command within the media and detecting the termination comprises identifying an audible stop command within the media.

20. The method of claim 19, wherein automatically editing comprises deleting audio content between the first point in the media and the second point in the media without altering visible content during the first point in the media and the second point in the media.

* * * * *